Feb. 25, 1930.  J. H. BROWN  1,748,669

REFRIGERATING MACHINE

Filed Aug. 6, 1925   3 Sheets-Sheet 1

Inventor
John H. Brown;
By R. S. Berry
Attorney

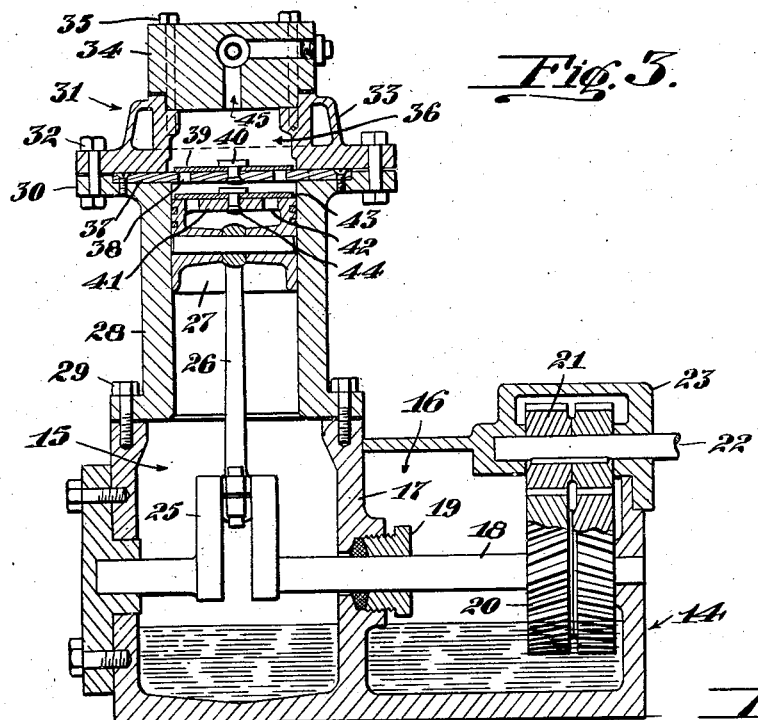
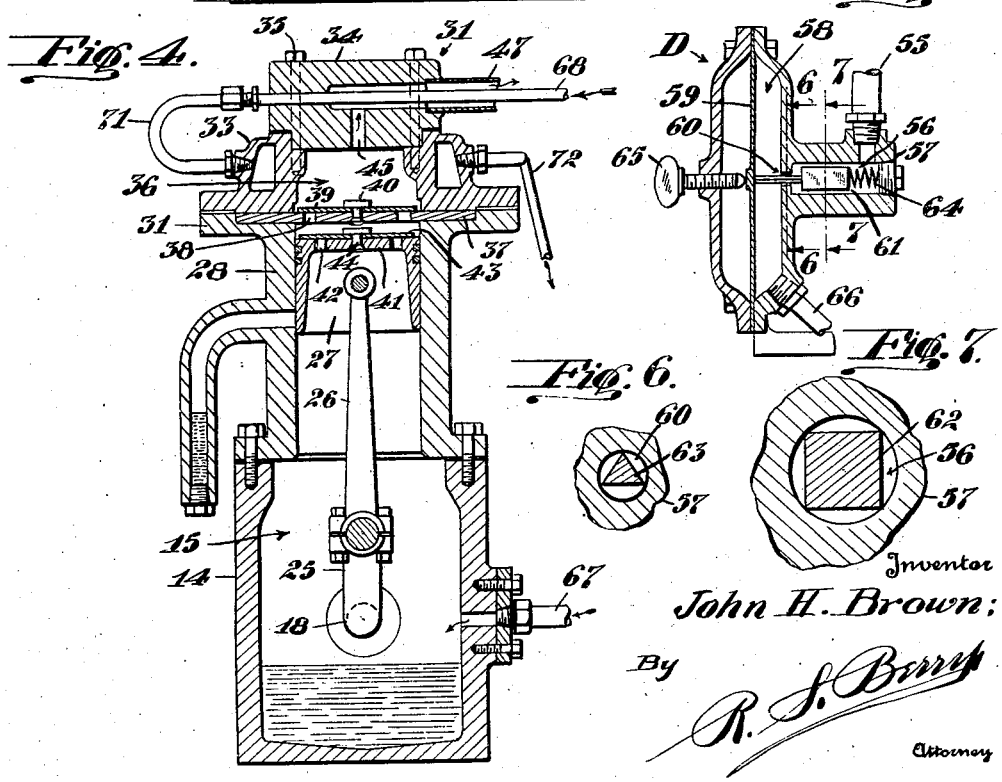

Feb. 25, 1930.  J. H. BROWN  1,748,669
REFRIGERATING MACHINE
Filed Aug. 6, 1925   3 Sheets-Sheet 3
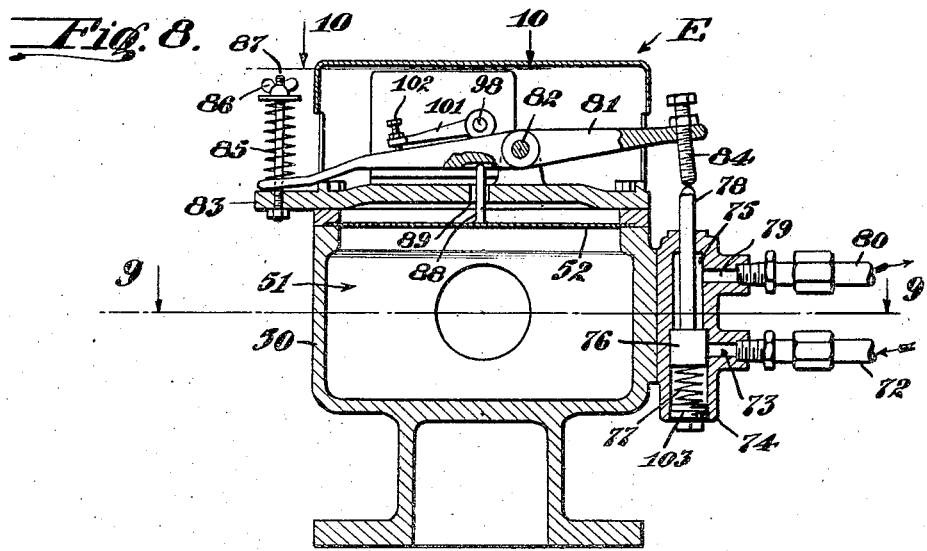
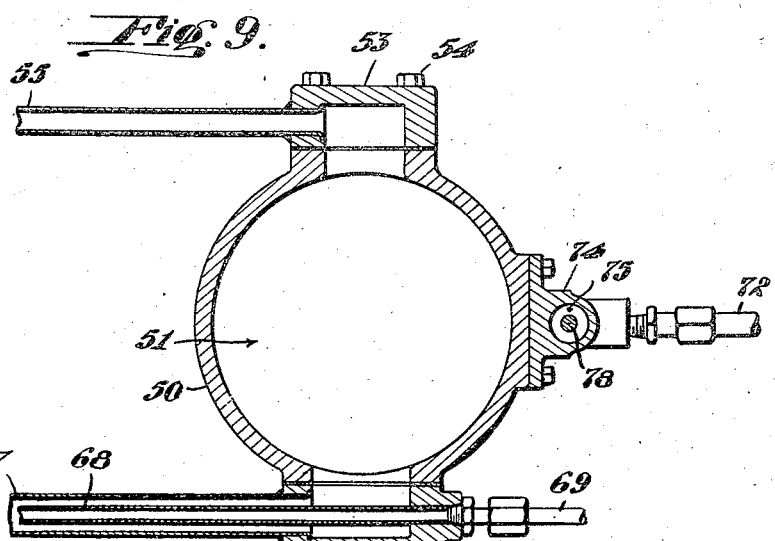
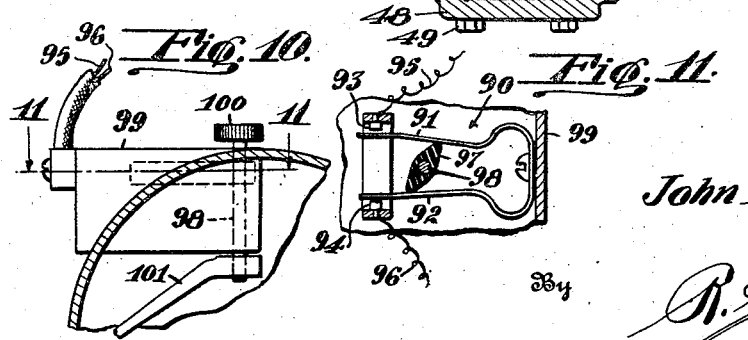
Inventor
John H. Brown:
By R. S. Berry
Attorney Patented Feb. 25, 1930

1,748,669

UNITED STATES PATENT OFFICE

JOHN HILTON BROWN, OF HOLLYWOOD, CALIFORNIA, ASSIGNOR, BY MESNE ASSIGNMENTS, TO INSTANT-ICE CORPORATION, A CORPORATION OF DELAWARE

REFRIGERATING MACHINE

Application filed August 6, 1925. Serial No. 48,476.

This invention relates to a refrigerating machine of the type in which a liquefiable gas or vapor is compressed then relieved of heat so as to diminish its volume and then caused to expand so as to lower its temperature and thereafter to absorb heat and thereby effect a refrigerating action.

An object of the invention is to provide a refrigerating machine which is especially applicable for use in operating refrigerators where a comparatively small capacity is required, such, for example, as where ice is ordinarily employed as a cooling medium; and which is particularly serviceable as a household refrigerator.

Another object is to provide a refrigerating machine which is compact, simple in construction economical in operation and in which the parts are so constructed and arranged to enable ready assemblage thereof and to give accessibility thereto to facilitate replacements and repairs but which is not liable to get out of order.

A further object is to provide a refrigerating machine of the above character embodying means for automatically controlling its operation so as to obviate any possibility of creating an excessive pressure therein and including automatic means for effecting cessation of operation thereof when the gas or vapor is compressed to a predetermined pressure, and further including a simple and effective means for automatically controlling the flow of liquid employed in effecting the removal of heat from the compressed gas or vapor.

The invention resides generally in the provision of a refrigerating machine embodying a motor driven compressor, a heat absorber and an expansion valve, together with an adjustable automatic control device operable by the influence of a predetermined gas pressure created by the compressor to control the flow of a cooling medium employed in the heat remover and also operable to stop operation of the motor and thereby bring the machine to rest in event of the creation of excessive pressure therein; the invention residing more specifically in the construction and arrangement of the compressor and the heat remover and in the parts thereof and in the features of the automatic control as hereinafter set forth and pointed out in the appended claims.

The invention is illustrated in the accompanying drawings in which:—

Fig. 3 is a detail in vertical section of the compressor as seen on the line 3—3 of Fig. 1;

Fig. 4 is a detail cross sectional view of the compressor as seen on the line 4—4 of Fig. 1;

Fig. 5 is a detail in vertical section of the expansion valve as seen on the line 5—5 of Fig. 1;

Fig. 6 is a detail in cross section as seen on the line 6—6 of Fig. 5;

Fig. 7 is a detail in cross section as seen on the line 7—7 of Fig. 5;

Fig. 8 is a detail in vertical section partly in elevation of the automatic control mechanism as seen on the line 8—8 of Fig. 1;

Fig. 9 is a view in horizontal section as seen on the line 9—9 of Fig. 8;

Fig. 10 is a detail in horizontal section as seen on the line 10—10 of Fig. 8;

Fig. 11 is a detail in horizontal section as seen on the line 11—11 of Fig. 10.

Figure 1:
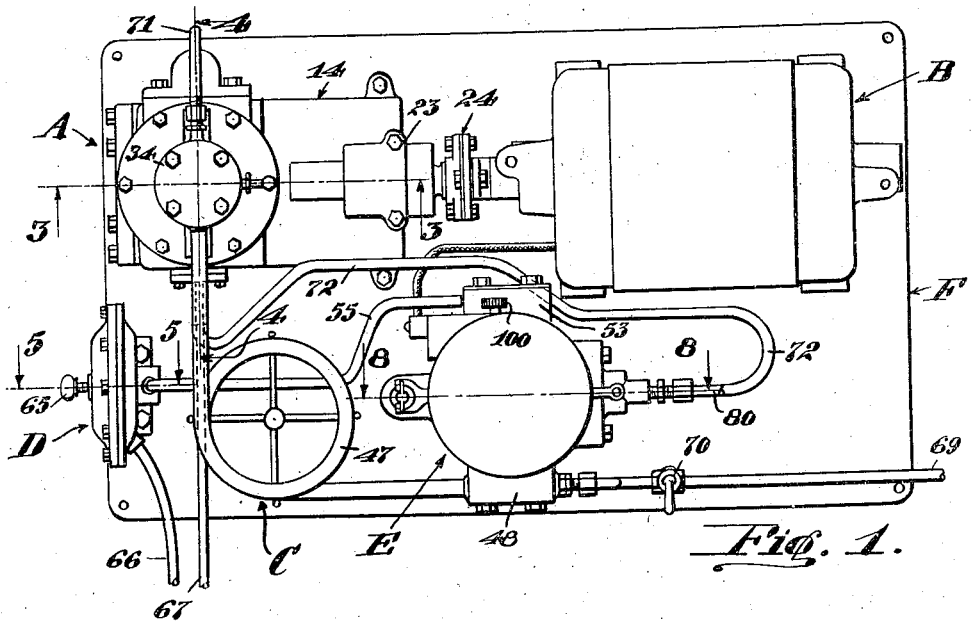
Fig. 1 is a plan view of the refrigerating machine.
Figure 2:
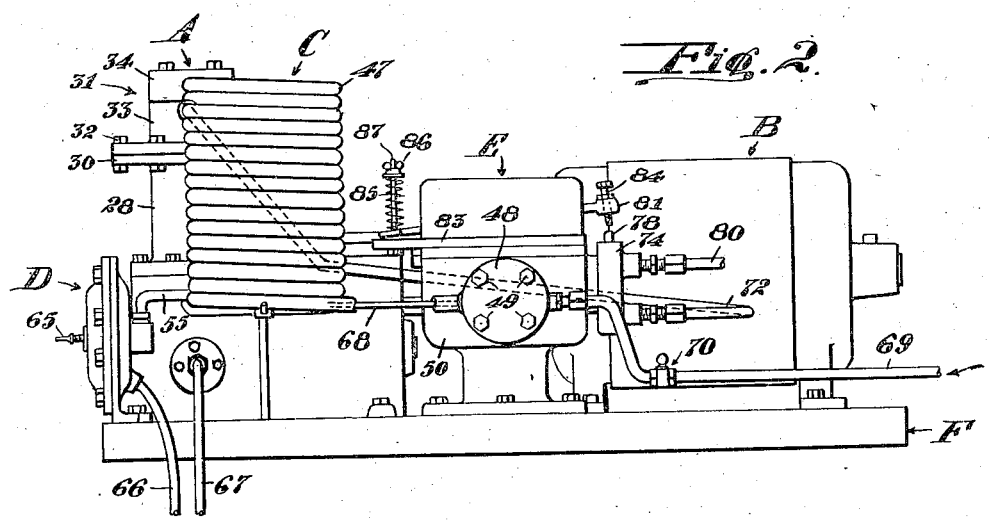
Fig. 2 is a view of same as seen in front elevation.

Referring to the drawings more specifically, A indicates generally a compressor, B a motor for operating the compressor, C a heat remover, D an expansion valve and E the automatic control device, all of which are here shown as supported on a bedplate F.

The compressor embodies a crank case 14 formed with chambers 15 and 16 separated by a partition 17 and which crank case is fitted with a crank shaft 18 extending through a packing gland 19 in the partition 17 and across the chambers 15 and 16 with the ends thereof journalled in suitable bearings on the end walls of the crank case. Affixed to the shaft 18 in the chamber 16 is a pair of oblique toothed spur gears 20 with which mesh pinions 21 on a drive shaft 22 journalled in a cover plate 23 closing the chamber 16, by which the drive shaft is adapted to be driven by the motor B through a flexible joint 24. The shaft 18 is formed with a crank 25 arranged in the chamber 15 fitted with a pitman 26 connecting with a piston 27 arranged to reciprocate vertically in a cylinder 28 extending over and enclosing the chamber 15 and demountably attached to the crank case by means of bolts 29. The upper end of the cylinder 28 is formed with a marginal flange 30 to which is secured a cylinder head 31 by means of bolts 32 and which cylinder head embodies a water jacketed annulus 33 and a head block 34 secured to the annulus 33 by bolt 35. The annulus 33 and head-block 34 enclose a chamber 36 within the cylinder head. Interposed between the cylinder and the cylinder head is a plate 37 formed with a series of apertures 38 affording a communication between the upper portion of the cylinder 28 above the piston 27 and the chamber 36 which apertures are normally closed by a flexible disc 39 seating on the upper face of the plate 37 and secured thereto by a rivet 40. The piston 27 is formed with an end wall 41 formed with a series of apertures 42 which afford a communication between the lower portion of the cylinder 28 and the upper portion thereof through the piston, which apertures are normally closed by a flexible disc 43 seating on the upper end of the piston 27 and held in place by means of a rivet 44. The discs 39 and 44 are formed of thin sheet metal and are adapted to be readily flexed around the rivets 40 and 44 and along their margins. The chamber 15 is designed to receive a liquefiable gas such as ammonia and also contains a suitable lubricant, which latter is splashed on rotation of the crank 25 to effect distribution of the lubricant through the wearing surfaces in the compressor.

The head-block 34 is formed with a passage 45 which leads from the chamber 36 and communicates with a coil 47 of tubing embodied in the heat remover C, the convolutions of which coil extend downwardly with the lowermost convolution leading to a header 48 secured by bolts 49 to a housing 50 embodied in the control device E; the housing 50 enclosing a chamber 51 below a diaphragm 52 with which chamber the coil 47 communicates through the header 48. A second header 53 is secured by bolts 54 to the housing 50 with which connects a conduit 55 communicating with the chamber 51 through the header 53, which conduit leads to and communicates with a passage 56 formed in a housing 57 embodied in the expansion valve D. The housing 57 is provided with a chamber 58 fitted with a diaphragm 59 which chamber 58 communicates with the passage 56 through a small circular port 60 adapted to be controlled by a valve 61 comprising a rectangular body portion 62 guided in the passage 56 having a triangular stem 63 extending through the port 60 and abutting against the diaphragm 59; the valve 61 being carried toward the port 60 by means of a spring 64. The valve 61 with the triangular stem 63 affords a restriction to the flow of gas from the passage 56 to the chamber 58, which restriction is regulated by means of a set screw 65 arranged to bear on the diaphragm 59 opposite the stem 63 as particularly shown in Fig. 5. Leading from the chamber 58 is a conduit 66 connecting with a suitable refrigerating coil arranged in a refrigerator in the ordinary manner, not necessary to be here shown, from whence a return conduit 67 leads to and communicates with the chamber 15 in the crank case 14.

Arranged within the tube forming the coil 47 is a pipe 68 which passes through the header 48 and connects with a pipe 69 leading to any suitable source of water supply under pressure, such as a city water main through a cut-off valve 70. The upper end portion of the pipe 68 passes through the head-block 34 and connects with the water jacket in the annulus 33 through a gooseneck 71. A conduit 72 leads from the water jacket 33 opposite its connection with the gooseneck 71 and connects with a port 73 in a valve casing 74 carried by the housing 50 of the control device E, which valve casing is provided with a passage 75 in which is reciprocably mounted a plunger valve 76 arranged to enclose and control the port 73; the plunger valve, when the machine is not operating, is moved to port closing position by means of a spring 77. A stem 78 projects upwardly from the plunger valve through the passage 75 and terminates above the valve casing 74 and is associated with an automatic mechanism for actuating the plunger valve as will be later described. The valve casing is provided with a port 79 leading from the upper end portion of the passage 75 and communicating with a conduit 80 leading to any suitable point of discharge. A rocker arm 81 is pivoted at 82 on a top plate 83 carried by the housing 50 and extending over the diaphragm 52, the outer end of which rocker arm is fitted with an adjustable screw 84 adapted to abut against the upper end of the plunger valve stem 78 to depress the plunger valve on downward movement of the outer end of the rocker arm. Bearing on the inner end of the rocker arm and yieldably opposing rocking movement of the latter in one direction and normally maintaining the inner end of the rocker arm in an uppermost position is a spring 85, the tension of which spring is adapted to be adjusted by means of a wing nut 86 screwed to a stem 87 carried by the plate 83 and around which the spring 85 is disposed. The diaphragm 52 is provided with an upwardly projecting stem 88 which extends through an opening 89 in the top plate 83 and is adapted to abut against the underside of the inner end portion of the rocker arm 81 whereby on expansion of the diaphragm 52 under the action of gas pressure in the chamber 51 the rocker arm is moved to effect depression of the plunger valve 76 to normally maintain the port 73 slightly open when the apparatus is in operation to permit the flow of water through the conduit 68 in the coil 47 and whereby the flow of water will be automatically increased or diminished or cut off according to variations of the gas pressure in the chamber 51.

As a means for stopping operation of the machine in event of excessive pressure being developed in the chamber 51, means are provided for cutting off the supply of electric current to the motor B controlled by the diaphragm 52, which means is here shown as embodying an electric switch 90 as shown in Figs. 10 and 11, which includes a pair of spaced spring contact members 91 and 92 which are electrically connected together and are normally spaced from contact members 93 and 94 connecting with electrical conductors 95 and 96 through which electrical current is directed to the motor B when the spring contact members 91 and 92 are contacting the contact members 93 and 94. The electrical circuit to the motor is normally closed by means of an insulated spreader 97 arranged to extend obliquely between the contact members 91 and 92 and to maintain the latter in their spread position, which spreader is mounted on a shaft 98 mounted in the switch housing 99 and carries a knurled head 100 by which the shaft 98 may be manually turned to position the spreader 97 to its switch-closing position. The shaft 98 is fitted with an arm 101 which extends over the rocker arm 81 and is provided with a set screw 102 arranged to be abutted by the inner end portion of the rocker arm 81 as the latter moves upwardly so as to effect rocking movement of the shaft 98 and causes the spreader 97 to be shifted under the action of the tension of the spring contact members 91 and 92 to disengage the latter and break the electrical circuit to the motor when the rocker arm 81 is moved under the influence of an excess pressure in the chamber 51.

In the operation of the invention, on rotation of the shaft 18 by the motor B the piston 27 is caused to reciprocate so that on its down stroke gas or vapors will pass to the space above the piston and beneath the plate 37 through the apertures 42 and around the margin of the disc 43, which disc closes the apertures 42 on upstroke of the piston 27 so as to cause the gas to be forced through the ports 38 around the disc 39 into the chamber 36 and into its communications, whereby the gas is compressed and subjected to a relatively high pressure throughout the coil 47, chamber 51 and conduit 55 by reason of the restriction afforded the flow of the gas through the expansion valve port 60. The gas pressure generated in the chamber 51 operates to slightly open the plunger valve 76 as before stated, to cause the flow of water through the pipe 68 in the coil 47 so as to effect removal of heat from the gas and thereby diminish its volume, which gas after passing through the port 60 in the expansion valve expands in the pipe 66 and the refrigerating coils so as to lower its temperature, thereby effecting the refrigerating action in the manner common in refrigerators of this type. The refrigerating fluid is then returned through the conduit 67 to the chamber 15 in the crank case to be re-circulated through the system by action of the piston 27. As pressure of the gas increases in the apparatus between the compressor and the expansion valve an increase in velocity flow of water through the coils 47 will be effected through the medium of the diaphragm 52, rocker arm 81 and plunger valve 76; the plunger valve being moved under increased expansion of the diaphragm 52 to increase opening of the port 73 and thereby permit an increased flow of water through the coil, thereby more rapidly cooling the compressed gas and reducing its pressure.

In case an abnormal pressure of gas develops as might occur in event the heat removing action of the water flowing through the pipe 68 is insufficient to cause proper pressure reduction when the port 73 is fully opened the rocker arm will then operate to cut off the flow of electrical current to the motor and thereby stop the compressor and thus prevent further generation of gas pressure. Water will then continue to flow through the pipe 68 and effect pressure reduction which will permit the diaphragm 52 to move toward normal and thereby allow spring 77 to move the plunger valve 76 and close port 73 to shut off the water supply. The apparatus will thus be automatically put out of operation and in order to again set it in operation it will be necessary to manually close the switch 90 through the medium of the knurled head 100, shaft 98 and spreader 97.

It is to be observed that the flow of water through the pipe 68 is counter to the flow of gas through the coil 47 so that the gas will be cooled progressively as it passes from the compressor to the expansion valve which insures a rapid removal of heat from the gas and results in an effective and efficient operation of the apparatus.

The degree of pressures developed in the apparatus are predetermined by adjusting the tension of the springs 85 and 77; the spring 85 being adjusted by the wing nut 86 as before stated, and the spring 77 being adjusted by means of a threaded plug 103 secured in the lower end of the valve casing 74 on which the spring 77 seats. The relative pressures between the high pressure developed between the compressor and the expansion valve, and the low pressure existing between the expansion valve and the refrigerating coils communicating with the chamber 15 below the compressor piston 27, is regulated by means of the set screw 65 on the expansion valve whereby the restriction afforded by the port 60 and 61 is regulated. The point at which operation of the motor and stoppage of the compressor will occur is determined by adjustment of the screw 102.

While I have shown and described a specific embodiment of my invention I do not limit myself to the exact details of construction and arrangements shown but may employ such changes and modifications as may come within the meaning of the appended claim.

I claim:—

In a refrigerating apparatus having a compressor, an expansion valve associated with the compressor, a water cooled condenser communicating with the compressor, a chamber having headers establishing communication with the expansion valve and condenser, and pressure responsive means disposed within said chamber above the headers aforesaid and operable by variation of the pressure of the refrigerant in said chamber to vary the flow of the water for cooling said condenser.

JOHN HILTON BROWN.